United States Patent
Liu et al.

(10) Patent No.: US 8,659,566 B2
(45) Date of Patent: Feb. 25, 2014

(54) TOUCH SENSING METHOD AND ELECTRONIC APPARATUS USING THE SAME

(75) Inventors: Jui-Ming Liu, Tainan (TW); Chung-Wen Chang, Tainan (TW); Shen-Feng Tai, Tainan (TW); Feng-Wei Yang, Tainan (TW)

(73) Assignee: Himax Technologies Limited, Tainan (TW)

( * ) Notice: Subject to any disclaimer, the term of this patent is extended or adjusted under 35 U.S.C. 154(b) by 157 days.

(21) Appl. No.: 13/274,170

(22) Filed: Oct. 14, 2011

(65) Prior Publication Data

US 2013/0093712 A1  Apr. 18, 2013

(51) Int. Cl.
*G06F 3/044* (2006.01)

(52) U.S. Cl.
USPC .......................................... 345/173; 345/179

(58) Field of Classification Search
USPC .......................................................... 345/173
See application file for complete search history.

(56) References Cited

U.S. PATENT DOCUMENTS

| | | | |
|---|---|---|---|
| 2006/0267953 A1* | 11/2006 | Peterson et al. | 345/173 |
| 2010/0079393 A1* | 4/2010 | Dews | 345/173 |
| 2010/0333011 A1* | 12/2010 | Kornev et al. | 715/773 |
| 2011/0084926 A1* | 4/2011 | Chang et al. | 345/173 |
| 2011/0102334 A1* | 5/2011 | Colley et al. | 345/173 |
| 2012/0062474 A1* | 3/2012 | Weishaupt et al. | 345/173 |
| 2012/0068954 A1* | 3/2012 | Chang et al. | 345/173 |

* cited by examiner

*Primary Examiner* — Van Chow
(74) *Attorney, Agent, or Firm* — J.C. Patents

(57) ABSTRACT

A touch sensing method adapted for an electronic apparatus including a touch panel is provided. The touch sensing method includes the following steps: driving the touch panel by a mutual capacitance mode and a self capacitance mode; sensing a gesture applied on the touch panel, wherein the gesture forms at least one touch area on the touch panel; determining at least one geometric center of the at least one touch area based on self-mode data obtained in the self capacitance mode; and determining at least one touch location associated with the gesture on the touch panel based on the at least one geometric center of the at least one touch area. Furthermore, an electronic apparatus to which the foregoing touch sensing method is applied is also provided.

14 Claims, 6 Drawing Sheets

TOUCH SENSING METHOD AND ELECTRONIC APPARATUS USING THE SAME

BACKGROUND OF THE INVENTION

1. Field of the Invention

The invention relates to a sensing method and an electronic apparatus using the same, and more particularly relates to a touch sensing method and an electronic apparatus using the same.

2. Description of Related Art

In this information era, reliance on electronic products is increasing day by day. The electronic products including notebook computers, mobile phones, personal digital assistants (PDAs), digital walkmans, and so on are indispensable in our daily lives. Each of the aforesaid electronic products has an input interface for a user to input his or her command, such that an internal system of each of the electronic product spontaneously runs the command. At this current stage, the most common input interface includes a keyboard and a mouse.

From the user's aspect, it is sometimes rather inconvenient to use the conventional input interface including the keyboard and the mouse. Manufacturers aiming to resolve said issue thus start to equip the electronic products with touch input interfaces, e.g. touch pads or touch panels, so as to replace the conditional keyboards and mice. At present, the users' commands are frequently given to the electronic products by physical contact or sensing relationship between users' fingers or styluses and the touch input interfaces.

However, for some applications, undesired issues may happen in touch devices. For example, the touch devices may have an undesired hollow effect under a low ground state. FIG. 1 shows a schematic diagram of the hollow effect in the related art. Referring to FIG. 1, the low ground state means that a touch device does not have a reference ground. That is to say, the touch device is put on a car holder or a table without connecting to a power core. When the touch panel 11 of the touch device is under the low ground state, the touch sensing controller (not shown) may report two error points P1 and P2 whereas the users' gesture simply touches the touch panel 11 with a big area 20 which should correspond to a single point. This phenomenon is called the hollow effect. The hollow effect detaches a single touch point from several touch points. Accordingly, how to prevent the touch sensing controller from reporting error points is one of the important issues at present.

SUMMARY OF THE INVENTION

The invention is directed to a touch sensing method capable of preventing the touch controller from reporting error points.

The invention is directed to an electronic apparatus capable of preventing the touch controller thereof from reporting error points.

The invention provides a touch sensing method adapted for an electronic apparatus including a touch panel. The touch sensing method includes the following steps: driving the touch panel by a mutual capacitance mode and a self capacitance mode; sensing a gesture applied on the touch panel, wherein the gesture forms at least one touch area on the touch panel; determining at least one geometric center of the at least one touch area based on self-mode data obtained in the self capacitance mode; and determining at least one touch location associated with the gesture on the touch panel based on the at least one geometric center of the at least one touch area.

In an embodiment of the invention, the electronic apparatus is not connected with a power core.

In an embodiment of the invention, the at least one geometric center is located inside the at least one touch area.

In an embodiment of the invention, the gesture forms a plurality of touch areas on the touch panel. Each of the touch areas has a geometric center.

In an embodiment of the invention, the step of determining the at least one geometric center of the at least one touch area comprises includes the following step: determining the geometric centers of the plurality of touch areas based on the self-mode data obtained in the self capacitance mode or mutual-mode data obtained in the mutual capacitance mode.

In an embodiment of the invention, the step of determining the at least one touch location associated with the gesture includes the following step: determining the touch locations associated with the gesture on the touch panel based on the geometric centers of the plurality of touch areas.

In an embodiment of the invention, the plurality of touch areas separate from each other.

The invention provides an electronic apparatus including a touch panel, a touch panel driving module, and a touch sensing controller. The touch panel senses a gesture applied thereon. The gesture forms at least one touch area on the touch panel. The touch panel driving module is connected to the touch panel and drives the touch panel by a mutual capacitance mode and a self capacitance mode. The touch sensing controller is connected to the touch panel and the touch panel driving module. The touch sensing controller determines at least one geometric center of the at least one touch area based on self-mode data obtained in the self capacitance mode and determines at least one touch location associated with the gesture on the touch panel based on the at least one geometric center of the at least one touch area.

In an embodiment of the invention, the touch sensing controller determines the geometric centers of the plurality of touch areas based on the self-mode data obtained in the self capacitance mode or mutual-mode data obtained in the mutual capacitance mode.

In an embodiment of the invention, the touch sensing controller determines the touch locations associated with the gesture on the touch panel based on the geometric centers of the plurality of touch areas.

In order to make the aforementioned and other features and advantages of the invention more comprehensible, embodiments accompanying figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Figure 1:
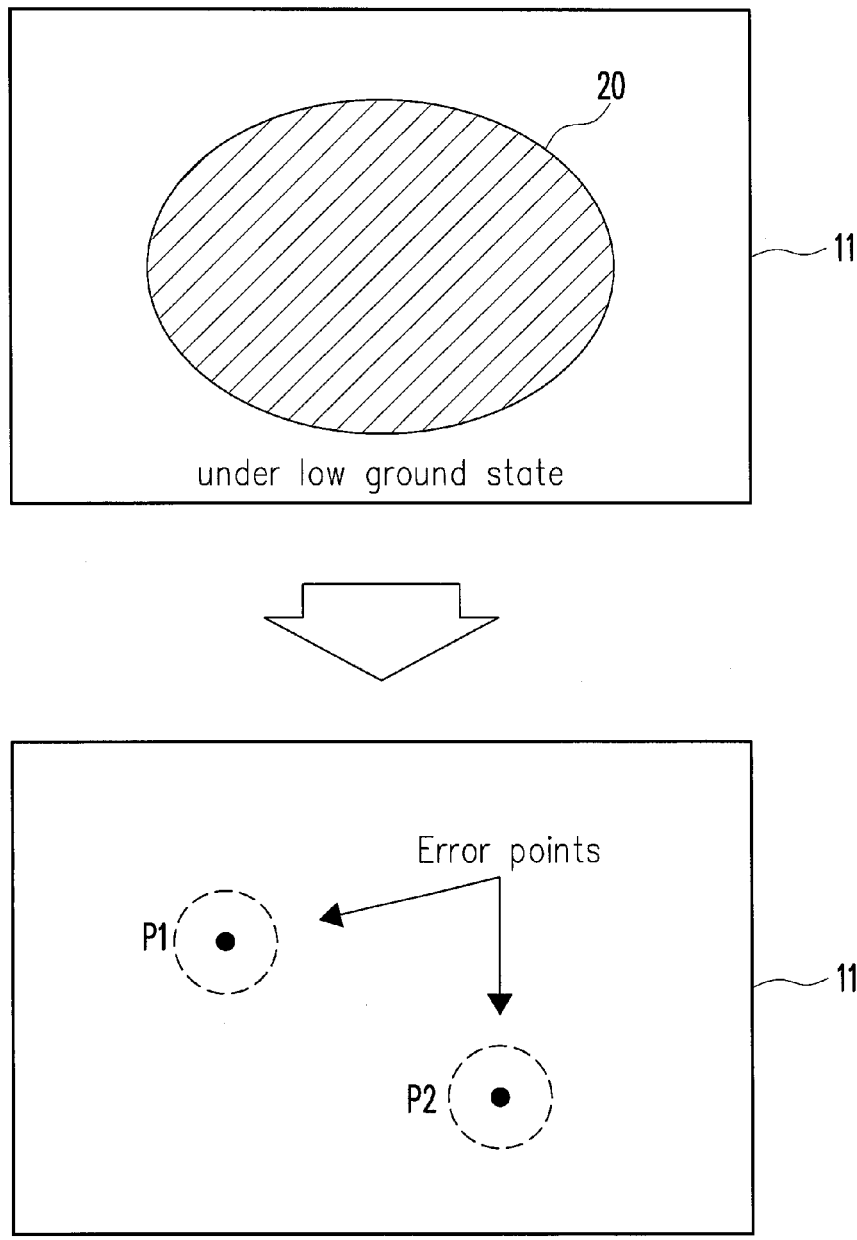
FIG. 1 shows a schematic diagram of the hollow effect in the related art.
Figure 2:
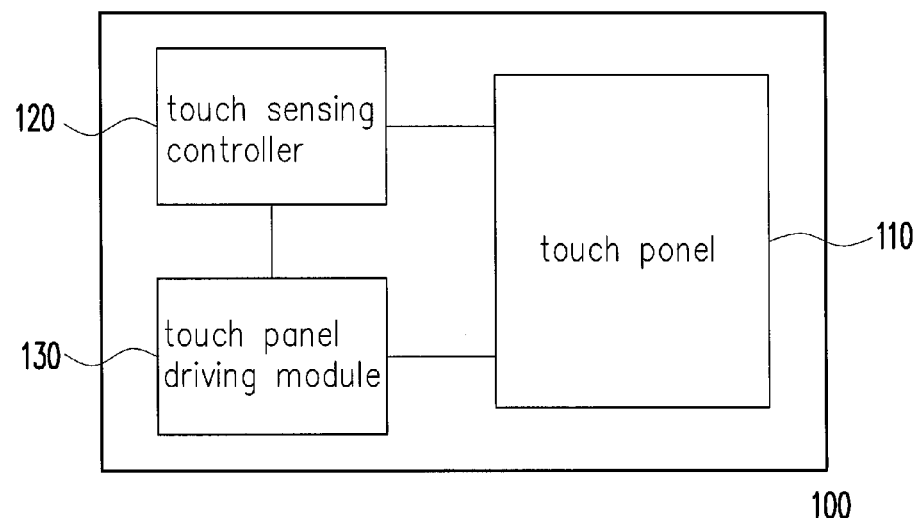
FIG. 2 shows a block diagram of an electronic apparatus according to an embodiment of the invention.

FIG. 2 shows a block diagram of an electronic apparatus according to an embodiment of the invention. Referring to FIG. 2, the electronic apparatus 100 of the present embodiment has multi-touch function for sensing users' gestures and includes a touch panel 110, a touch sensing controller 120, and a touch panel driving module 130. The touch panel 110 is configured to sense users' gestures applied thereon, and the touch sensing controller 120 is connected to the touch panel 110 and configured to control the electronic apparatus 100 to perform various functions associated with the users' gestures. The touch panel driving module 130 drives the touch panel 110 to sense users' gestures. In order to prevent the touch controller 120 from reporting error touch locations, a touch sensing method combining a self capacitance mode and a mutual capacitance mode is adopted for sensing users' gestures in the electronic apparatus 100.

Figure 3:
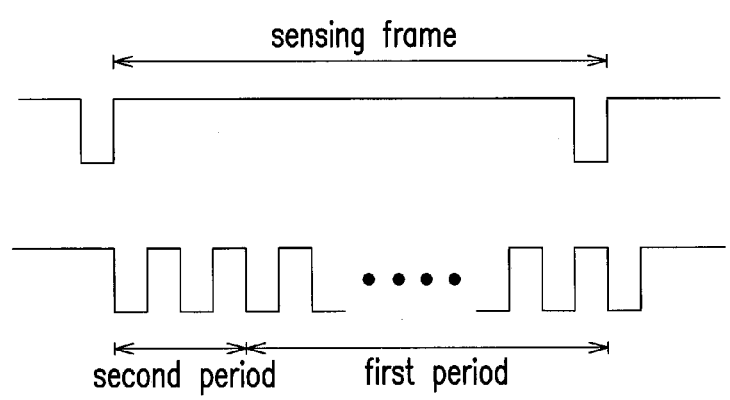
FIG. 3 shows a timing diagram of each sensing according to an embodiment of the invention.

FIG. 3 shows a timing diagram of each sensing according to an embodiment of the invention. Referring to FIG. 2 and FIG. 3, the touch panel driving module 130 of the present embodiment drives the touch panel 110 to sense users' gestures in a mutual capacitance mode during a first period of each sensing frame and senses the users' gestures in a self capacitance mode during a second period of each sensing frame. The touch sensing controller 120 receives a self-mode data and a mutual-mode data respectively obtained in the self capacitance mode and the mutual capacitance mode to determine touch locations associated with the users' gestures. In the present embodiment, the first period is longer than the second period in the sensing frame.

Herein, the electronic apparatus 100 may be a portable product (e.g. a mobile phone, a camcorder, a camera, a laptop computer, a game player, a watch, a music player, an e-mail receiver and sender, a map navigator, a digital picture, or the like), an audio-video product (e.g. an audio-video player or the like), a screen, a television, a bulletin, or a panel in a projector.

Figure 4:
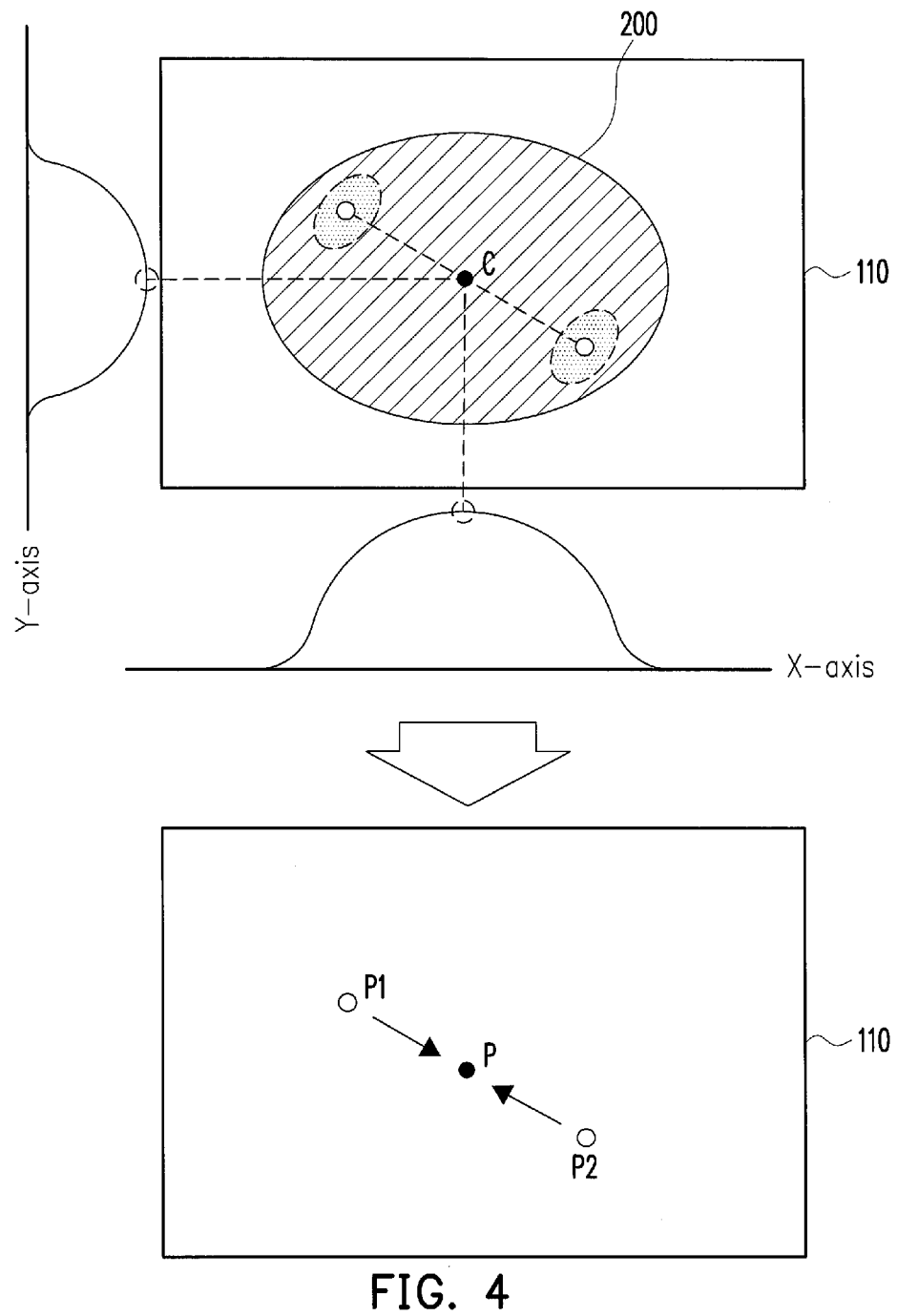
FIG. 4 shows a schematic diagram of the touch panel of the electronic apparatus working under the low ground state according to an embodiment of the invention.
Figure 5:
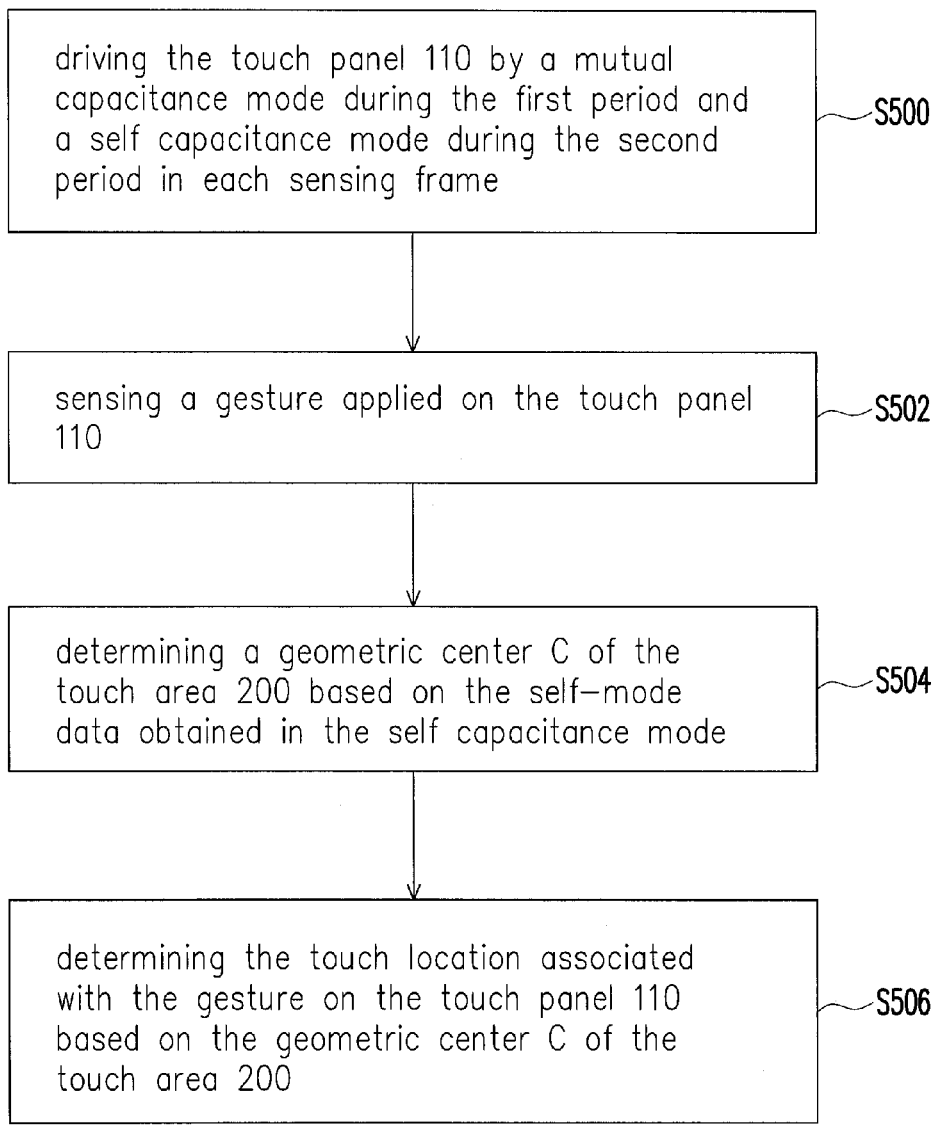
FIG. 5 shows a flowchart of the touch sensing method according to an embodiment of the invention.

FIG. 4 shows a schematic diagram of the touch panel of the electronic apparatus working under the low ground state according to an embodiment of the invention. FIG. 5 shows a flowchart of the touch sensing method according to an embodiment of the invention. Referring to FIG. 2 to FIG. 5, the low ground state means that the touch device 100 is put on a car holder or a table without connecting to a power core and thus does not have a reference ground in the present embodiment. In step S500, the touch panel driving module 130 drives the touch panel 110 by a mutual capacitance mode during the first period and a self capacitance mode during the second period in each sensing frame. Accordingly, the touch panel 110 senses a gesture applied thereon in step S502 so that the touch sensing controller 120 receives a mutual-mode data and a self-mode data respectively obtained in the self capacitance mode and the mutual capacitance mode. In the present embodiment, the gesture forms a big touch area 200 on the touch panel 110. If the touch sensing controller 120 determines the touch location associated with the gesture simply based on the mutual-mode data, the hollow effect may happen. As a result, the touch sensing controller 120 erroneously reports two points P1 and P2 as the touch location associated with the gesture. In order to prevent from the hollow effect, the touch sensing controller 120 determines the touch location associated with the gesture at least based on the self-mode data.

In step S504, the touch sensing controller 120 determines a geometric center C of the touch area 200 based on the self-mode data obtained in the self capacitance mode. For example, the x-coordinate of the geometric center C is determined based on the sensing waveform of the self-mode data in the x-axis and substantially corresponds to the peak value of the sensing waveform. Similarly, the y-coordinate of the geometric center C substantially corresponds to the peak value of the sensing waveform in the y-axis. In this manner, the coordinate point of C is thus determined. It should be noted that the coordinate of the geometric center C corresponding to the peak value of the sensing waveform is exemplary, and the invention is not limited thereto.

Next, in step S506, the touch sensing controller 120 determines the touch location associated with the gesture on the touch panel 110 based on the geometric center C of the touch area 200. For a single touch area, the geometric center C is located inside the single touch area 200. The touch sensing controller 120 reports a single point P as the touch location instead of the two points P1 and P2. The touch location is exactly determined, and the hollow effect is avoided.

In this embodiment, the electronic apparatus 100 is under the low ground state, and one point is touched on the touch panel 110. However, the touch sensing method of the invention can also be applied to another case in which multi-points are touched on the touch panel 110.

Figure 6:
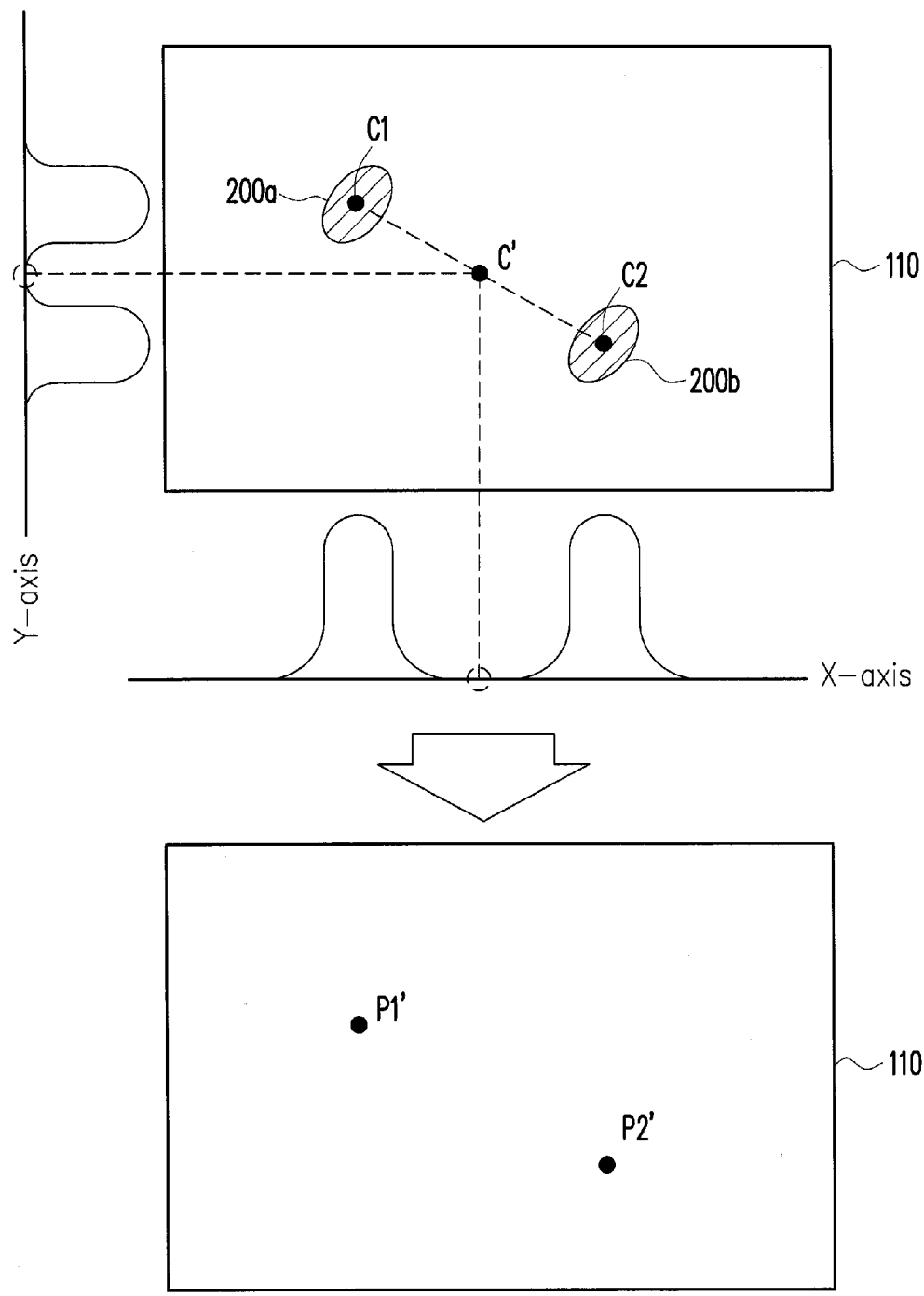
FIG. 6 shows a schematic diagram of the touch panel of the electronic apparatus working under the low ground state according to another embodiment of the invention.
Figure 7:
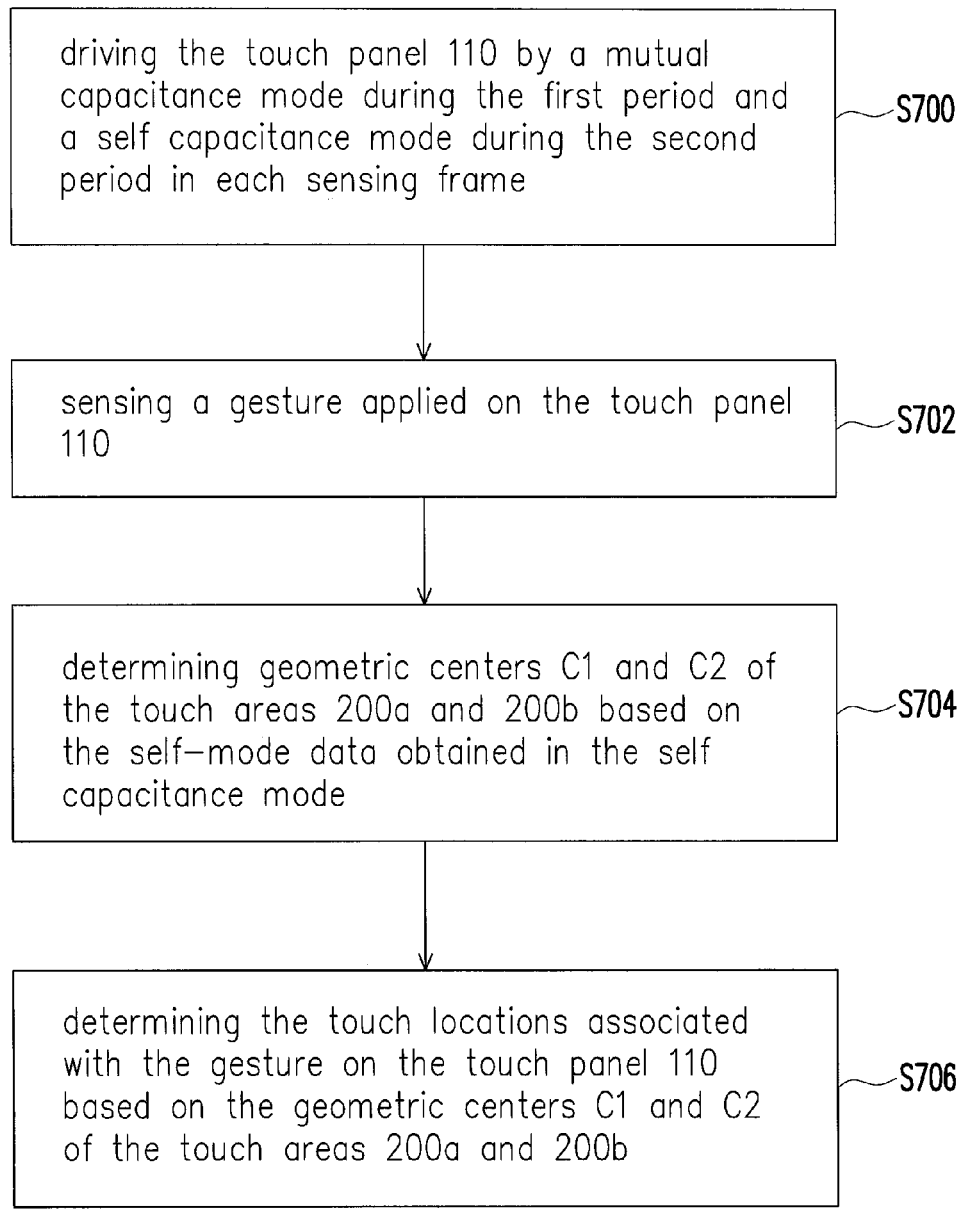
FIG. 7 shows a flowchart of the touch sensing method according to another embodiment of the invention.

FIG. 6 shows a schematic diagram of the touch panel of the electronic apparatus working under the low ground state according to another embodiment of the invention. FIG. 7 shows a flowchart of the touch sensing method according to another embodiment of the invention. Referring to FIG. 2, FIG. 6, and FIG. 7, the electronic apparatus 100 still works under the low ground state, and multi-points are touched on the touch panel 110. Two touch areas 200a and 200b separating from each other are exemplary for description in the present embodiment.

In step S700, the touch panel driving module 130 drives the touch panel 110 by a mutual capacitance mode during the first period and a self capacitance mode during the second period in each sensing frame. Accordingly, in step S702, the touch panel 110 senses a gesture applied thereon, and thus the touch sensing controller 120 receives a mutual-mode data and a self-mode data respectively obtained in the self capacitance mode and the mutual capacitance mode.

In the present embodiment, the touch areas 200a and 200b respectively have geometric centers C1 and C2. The common geometric center C' of the touch areas 200a and 200b is determined based on the geometric centers C1 and C2 and located on a straight line connecting the geometric centers C1 and C2. In step S704, the touch sensing controller 120 determines the geometric centers C1 and C2 based on the self-mode data obtained in the self capacitance mode. That is to say, based on the sensing waveforms of the self-mode data, the x-coordinate and y-coordinate of the geometric center C1 is determined and substantially corresponds to the peak values of the left sensing waveform in the x-axis and the upper sensing waveform in the y-axis in FIG. 6. Similarly, the x-coordinate and y-coordinate of the geometric center C2 substantially corresponds to the peak values of the right sensing waveform in the x-axis and the lower sensing waveform in the y-axis.

Next, in step S706, the touch sensing controller 120 determines the touch locations associated with the gesture on the touch panel based on the geometric centers C1 and C2 of the touch areas 200a and 200b. The touch sensing controller 120 reports the two correct points P1' and P2' as the touch locations. It should be noted that the touch areas 200a and 200b in FIG. 6 are small enough so that the hollow effect does not happen. In other words, the geometric centers C1 and C2 may also be determined by the touch sensing controller 120 based on the mutual-mode data obtained in the mutual capacitance mode in step S704.

Furthermore, in the present embodiment, the common geometric center C' of the touch areas 200a and 200b does not lie in any peak of the sensing waveform, and the coordinate of the common geometric center C' is not determined as the touch location.

In summary, in the exemplary embodiments of the invention, the touch sensing method combines the self capacitance mode and the mutual capacitance mode during each sensing frame. Under the low ground state, the touch controller determines the touch location associated with users' gestures at least based on self-mode data obtained in the self capacitance mode to prevent from reporting error touch locations due to the hollow effect.

Although the invention has been described with reference to the above embodiments, it will be apparent to one of the ordinary skill in the art that modifications to the described embodiment may be made without departing from the spirit of the invention. Accordingly, the scope of the invention will be defined by the attached claims not by the above detailed descriptions.

What is claimed is:

1. A touch sensing method, adapted for an electronic apparatus comprising a touch panel, the touch sensing method comprising:
    driving the touch panel by a mutual capacitance mode and a self capacitance mode;
    sensing a gesture applied on the touch panel, wherein the gesture forms at least one touch area on the touch panel;
    if the at least one touch area is larger than a threshold area, determining at least one geometric center of the at least one touch area based on a self-mode data obtained in the self capacitance mode, wherein if the at least one touch area is larger than the threshold area, a hollow effect occurs; and
    determining at least one touch location associated with the gesture on the touch panel based on the at least one geometric center of the at least one touch area,
    wherein the self-mode data and the mutual-mode data are obtained under different sensing modes, and one of the self-mode data and the mutual-mode data is not generated from another one of the self-mode data and the mutual-mode data.

2. The touch sensing method as claimed in claim 1, wherein the electronic apparatus is not connected with a power core.

3. The touch sensing method as claimed in claim 1, wherein the at least one touch geometric center is located inside the at least one touch area.

4. The touch sensing method as claimed in claim 1, wherein the gesture forms a plurality of touch areas on the touch panel, each of the plurality of touch areas has a geometric center.

5. The touch sensing method as claimed in claim 4, wherein the step of determining the at least one geometric center of the at least one touch area comprises:
    if each of the plurality of touch areas is not larger than the threshold area, determining the geometric centers of the plurality of touch areas based on the self-mode data obtained in the self capacitance mode or a mutual-mode data obtained in the mutual capacitance mode.

6. The touch sensing method as claimed in claim 5, wherein the step of determining the at least one touch location associated with the gesture comprises:
    determining the touch locations associated with the gesture on the touch panel based on the geometric centers of the plurality of touch areas.

7. The touch sensing method as claimed in claim 4, wherein the plurality of touch areas separate from each other.

8. An electronic apparatus, comprising:
    a touch panel sensing a gesture applied thereon, wherein the gesture forms at least one touch area on the touch panel;
    a touch panel driving module connected to the touch panel and driving the touch panel by a mutual capacitance mode and a self capacitance mode; and
    a touch sensing controller connected to the touch panel and the touch panel driving module, if the at least one touch area is larger than a threshold area, determining at least one geometric center of the at least one touch area based on a self-mode data obtained in the self capacitance mode, wherein if the at least one touch area is larger than the threshold area, a hollow effect occurs, and determining at least one touch location associated with the gesture on the touch panel based on the at least one geometric center of the at least one touch area,
    wherein the self-mode data and the mutual-mode data are obtained under different sensing modes, and one of the self-mode data and the mutual-mode data is not generated from another one of the self-mode data and the mutual-mode data.

9. The electronic apparatus as claimed in claim 8, wherein the electronic apparatus is not connected with a power core.

10. The electronic apparatus as claimed in claim 8, wherein the at least one geometric center is located inside the at least one touch area.

11. The electronic apparatus as claimed in claim 8, wherein the gesture forms a plurality of touch areas on the touch panel, each of the plurality of touch areas has a second geometric center.

12. The electronic apparatus as claimed in claim 11, wherein if each of the plurality of touch areas is not larger than the threshold area, the touch sensing controller determines the geometric centers of the plurality of touch areas based on the self-mode data obtained in the self capacitance mode or a mutual-mode data obtained in the mutual capacitance mode.

13. The electronic apparatus as claimed in claim 12, wherein the touch sensing controller determines the touch locations associated with the gesture on the touch panel based on the geometric centers of the plurality of touch areas.

14. The electronic apparatus as claimed in claim 11, wherein the plurality of touch areas separate from each other.

* * * * *